United States Patent [19]

Morio et al.

[11] 4,189,758
[45] Feb. 19, 1980

[54] APPARATUS FOR CONTROLLING THE SCANNING PATH OF A ROTARY TRANSDUCER

[76] Inventors: Minoru Morio, 29-24-801 Sakuragioka-cho, Shibuya-ku, Tokyo; Yukio Kubota, 1-26-4 Minamisenzo-ku, Ohta-ku, Tokyo; Hidehiko Okada, 5-4-36-102 Yokodai, Isogo-ku, Yokohama-shi, Kanagawa-ken, all of Japan

[21] Appl. No.: 953,186

[22] Filed: Oct. 20, 1978

[30] Foreign Application Priority Data

Oct. 24, 1977 [JP] Japan ................. 52-127361

[51] Int. Cl.$^2$ .............. G11B 21/10; G11B 21/08; G11B 21/18; H04N 5/78
[52] U.S. Cl. ........................ 360/77; 360/10; 360/11; 360/70; 360/76; 360/78
[58] Field of Search .............. 360/10, 11, 70, 75, 360/76, 77, 78, 106, 107, 108, 109

[56] References Cited
U.S. PATENT DOCUMENTS

| | | | |
|---|---|---|---|
| 3,821,787 | 6/1974 | Kihara | 360/70 X |
| 3,918,085 | 11/1975 | Numakura et al. | 358/4 |
| 4,007,482 | 2/1977 | Amari | 358/4 |
| 4,007,484 | 2/1977 | Amari | 358/8 |
| 4,080,636 | 3/1978 | Ravizza | 360/77 |
| 4,141,047 | 2/1979 | Kambara et al. | 360/77 |
| 4,143,405 | 3/1979 | Kubota | 360/10 |

*Primary Examiner*—Bernard Konick
*Assistant Examiner*—Donald McElheny, Jr.

[57] ABSTRACT

Apparatus for controlling the scanning path of a rotary transducer which is used in a signal reproducing system of the type having at least one rotary transducer which scans across a movable record medium to reproduce, during each pass of the transducer, signals which are recorded in parallel record tracks, the apparatus being particularly useful when the record medium is moved either at a faster-than-normal or slower-than-normal speed so that the transducer scans plural record tracks during each pass thereof. A control signal generator produces a periodic tracking control signal which is synchronized with the speed at which the record medium is moved, the periodic control signal having a plurality of periods during each pass of the transducer. An adjustable support is provided for the transducer, the adjustable support being responsive to the tracking control signal to displace the transducer transversely of the scanning path thereof, such that the transducer scans successive segments of predetermined record tracks during each pass thereof. In one embodiment wherein the transducer is used to scan adjacent record tracks which have been recorded with different azimuth angles, the adjustable support is controlled such that a segment of one record track is scanned, then the next adjacent record track is skipped and a segment of the next following record track is scanned and so on. Thus, only segments of those record tracks which are recorded with the same azimuth angle are scanned. This apparatus is especially useful in a search mode of, for example, a recorded video tape.

10 Claims, 11 Drawing Figures

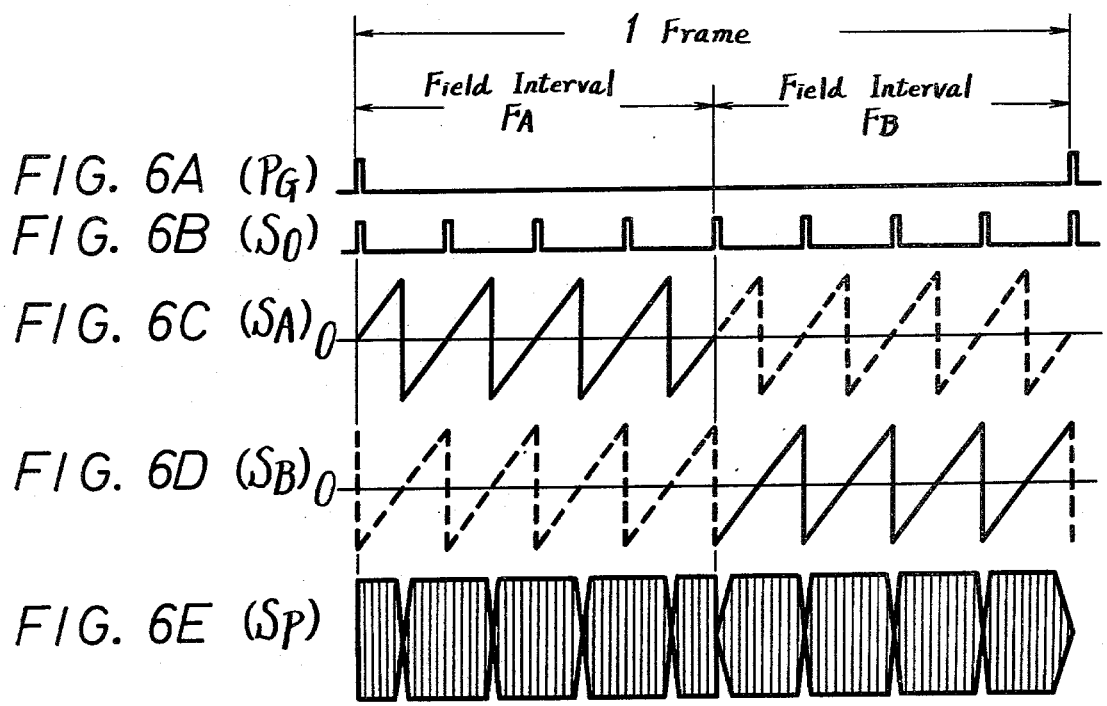
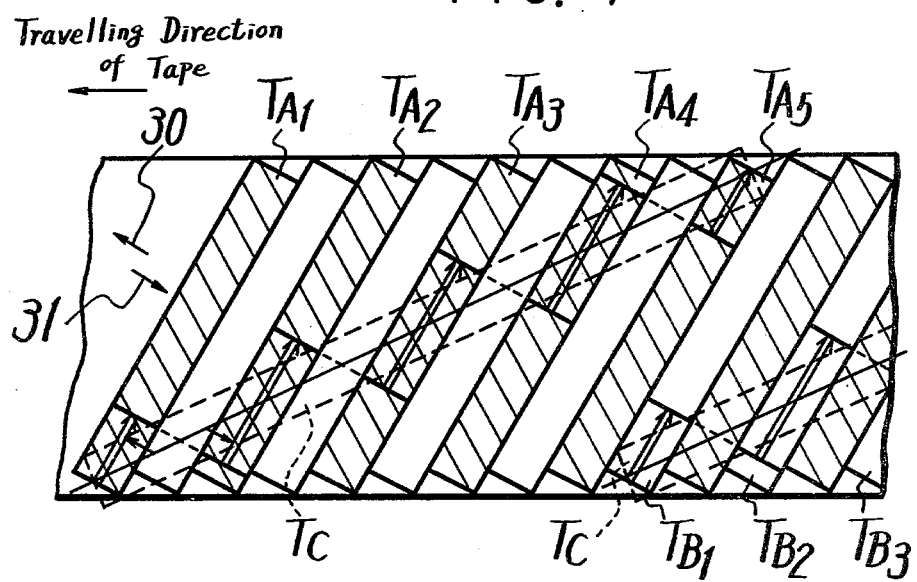

APPARATUS FOR CONTROLLING THE SCANNING PATH OF A ROTARY TRANSDUCER

BACKGROUND OF THE INVENTION

This invention relates to apparatus for controlling the scanning path of a rotary transducer as the transducer scans across a movable record medium and, more particularly, to such apparatus wherein the scanning path of the transducer is controlled when the record medium is moved at a faster-than-recording or slower-than-recording speed, such as during a search mode of a previously recorded video tape.

In one type of signal recording apparatus, such as a video tape recorder (VTR) of the so-called helical scan type, a magnetic tape is wrapped helically about a portion of the periphery of a guide drum, and two magnetic recording heads alternately scan parallel tracks across the tape as the tape is moved. Typically, the magnetic heads are disposed at an angular distance of 180° with respect to each other; and the record tracks are skewed with respect to the direction in which the tape is moved. In one type of helical scan VTR, the adjacent parallel record tracks which are recorded by the alternate passes of the magnetic heads are spaced apart from each other by guard bands. In another type of helical scan VTR, the recording density is increased by eliminating such guard bands and recording the parallel record tracks in substantially contiguous form.

In the helical scan VTR wherein contiguous record tracks are recorded, the problem of crosstalk interference due to unwanted signals which are picked up from adjacent record tracks during a reproducing operation is avoided by recording the adjacent record tracks with magnetic heads having different azimuth angles. As is known, if the luminance signal of a composite color video signal is frequency-modulated onto a relatively higher frequency carrier, then, because of the phenomenon of azimuth loss which is directly related to the frequency of the signals, those signals which are recorded in an adjacent track by a magnetic head having a different azimuth angle than the head which is used to reproduce the recorded signals from a given track will be substantially attenuated. Of course, the magnetic playback head should have the same azimuth angle as the head which was used to record the signals in the tracks which are scanned by that playback head. In this manner, crosstalk interference due to adjacent tracks is substantially avoided.

In many uses of a VTR, it is desired to move the tape rapidly therethrough so as to arrive at a preselected portion from which desired signals can be reproduced. Often, that preselected portion is identified only by recognizing the video picture which is reproduced from the VTR. However, if the tape is transported at its normal playback speed, it is appreciated that a significant amount of time is required until the user recognizes that the tape has been transported to its preselected position. Accordingly, there is a definite need to provide a high-speed search mode in a VTR whereby the tape can be transported rapidly until the preselected portion thereof is reached.

Unfortunately, in a typical VTR that is operated at a high-speed playback mode in either the forward or rewind tape direction, i.e., in a VTR having a high-speed search mode, the video picture which is reproduced during this mode generally is so degraded that the user often is unable to recognize when the tape has been transported to its preselected portion. This is because, and as shown in FIG. 3 of the accompanying drawings, when the tape is transported at high speed, the scanning path of a playback head across the tape does not coincide with the parallel record tracks which had been recorded thereon. For example, if the tape is transported at a speed which is nine times the normal playback speed, the scanning path of the playback head will traverse nine previously recorded record tracks. This means that the playback head will scan a segment of one track which had been recorded with the same azimuth angle as that head, followed by a segment of the next adjacent track which is recorded with a different azimuth angle, followed by a segment of the next following track which is recorded with the same azimuth angle, and so on. As a consequence thereof, and because of the recognized phenomenon of azimuth loss, the signals which are reproduced from those segments of the record tracks which had been recorded with a different azimuth angle will be substantially attenuated, effectively to a zero signal level. Consequently, the video picture which is reproduced from these signals will have large horizontal noise bands corresponding to those signals which are reproduced from the segments that had been recorded with a different azimuth angle. These horizontal noise bands seriously degrade the video picture, making it difficult for the user to recognize the displayed video information. A similar problem exists if the tape is transported at a lower-than-normal playback speed wherein the playback head traverses a plurality of different record tracks during its pass. Here too, segments will be scanned from alternate tracks which had been recorded with the same azimuth angle, these segments being interspersed with segments from tracks which had been recorded with the different azimuth angle.

It has been proposed, for example, in copending application Ser. No. 832,368, filed Sept. 12, 1977, now U.S. Pat. No. 4,141,047 and also in copending application Ser. No. 825,861, filed Aug. 18, 1977, and also in U.S. Pat. No. 4,080,636, and other U.S. applications mentioned therein, that tracking errors in the scanning path of a rotary transducer can be corrected if the transducer is supported on an adjustable support assembly, such as a so-called bi-morph leaf assembly. A bi-morph assembly is adapted to deflect in a direction and by an amount depending upon the polarity and amplitude of an electrical signal applied thereacross. Hence, and as described in the aforementioned applications and patent, the bi-morph leaf assembly can be suitably controlled so as to deflect the transducer supported thereon in a direction transversely of its scanning path so that the transducer is adjusted to coincide with the parallel record tracks which are scanned thereby. Although tracking errors are minimized or avoided by use of a suitably controlled bi-morph leaf assembly, it can be appreciated, from FIG. 3 of the accompanying drawings, that the deflection of such a bi-morph leaf assembly to scan only a single track during the high-speed search mode would be beyond the capability of existing apparatus.

OBJECTS OF THE INVENTION

Therefore, it is an object of the present invention to provide improved apparatus which overcomes the aforenoted problems attending a high-speed search operation in video signal reproducing apparatus.

Another object of this invention is to provide apparatus for controlling the scanning path of a playback transducer, or head, when the transducer scans across a record medium which is moved at a higher-than-normal or a lower-than-normal playback speed.

A further object of this invention is to provide apparatus for controlling the scanning path of a transducer in, for example, a video tape recorder, wherein a video picture is reproduced during the high-speed searching of the record tracks which had been recorded previously on the magnetic tape.

An additional object of this invention is to provide apparatus for controlling the scanning path of a transducer across a record medium which moves at a relatively high speed such that the transducer scans successive segments of predetermined record tracks, which had been recorded previously on the record medium, during each pass of the transducer.

Yet another object of the present invention is to provide tracking control apparatus, including a bi-morph leaf assembly, whereby a transducer traverses a plurality of previously recorded record tracks, which had been recorded on a movable record medium, and is caused to scan only portions, or segments, of predetermined ones of such record tracks.

Various other objects, advantages and features of the present invention will become readily apparent from the ensuing detailed description, and the novel features will be particularly pointed out in the appended claims.

SUMMARY OF THE INVENTION

In accordance with the present invention, apparatus for controlling the scanning path of a rotary transducer in a signal reproducing system is provided, this apparatus having particular control over the transducer when the record medium is moved at a speed different from the recording speed thereof such that the transducer scans plural record tracks during each pass across the record medium. A control signal generator produces a periodic tracking control signal that is synchronized with the speed at which the record medium is moved, the periodic control signal having a plurality of periods during each pass of the transducer. An adjustable support is provided for the transducer, the adjustable support being responsive to the tracking control signal to displace the transducer transversely of the scanning path thereof, such that the transducer scans successive segments of predetermined record tracks during a pass across the record medium. In a particular application of the present invention, the signal reproducing system is a video signal playback device and the record medium is moved at a relatively high search-mode speed while video signals are reproduced therefrom. In one aspect of this invention, adjacent record tracks contain video signals which had been recorded by recording heads having different azimuth angles. A pair of playback heads, having azimuth angles corresponding to the recording azimuth angles, alternately rotate along respective scanning paths across the record medium and are controlled by the adjustable supports upon which they are supported, respectively, to scan segments only of those record tracks which had been recorded with corresponding azimuth angles.

In accordance with another aspect of the present invention, the periodic tracking control signal is a sawtooth waveform having a plurality of periods during each pass of the transducer. The adjustable supports are bi-morph leaf assemblies which respond to the sawtooth waveforms supplied thereto to displace the respective playback heads in directions which depend upon the polarity of the sawtooth waveform. Accordingly, the deflections of the bi-morph leaf assemblies are such that each playback head effectively "skips over" those record tracks which had been recorded with an azimuth angle which differs from the azimuth angle of that playback head.

BRIEF DESCRIPTION OF THE DRAWINGS

The following detailed description, given by way of example, will best be understood in conjunction with the accompanying drawings in which:

FIGS. 6A–6E are waveform diagrams of various signals which are produced by the apparatus shown in FIG. 5; and FIG. 7 is a schematic illustration of how the record tracks on a record medium are scanned by a controlled transducer when the medium is moved at a relatively high speed, in accordance with the present invention.

DETAILED DESCRIPTION OF A PREFERRED EMBODIMENT

For the purpose of simplification, and in order to facilitate an understanding of the present invention, the following description is limited to the environment of a signal reproducing device, such as a signal recorder/reproducer, and more particularly, to a video tape recorder (VTR). However, it will become readily apparent that the present invention can be used in other types of signal reproducers, such as analog or digital signal reproducers, wherein moving heads scan a record medium. Furthermore, although the record medium described herein is, illustratively, magnetic tape, it should be readily apparent that other types of record media, such as magnetic sheets, magnetic discs, and the like can be used.

Figure 1:
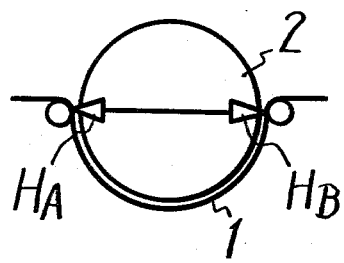
FIG. 1 is a plan schematic view of one example of a rotary transducer assembly in a record and/or playback device.

Turning now to FIG. 1, there is schematically illustrated a top view of a typical rotary head scanning device, such as the rotary head assembly used in a helical type VTR. As is conventional, this device is formed with two magnetic heads HA and HB which may be, for example, recording heads, or record/playback heads. These heads are adapted for rotation about a central axis. A guide drum 2 is adapted to receive a record medium, such as magnetic tape 3, wrapped helically thereabout for at least 180°. Heads HA and HB may be mounted on diametrically opposed arms which are rotated so as to scan successive, parallel, skewed tracks across magnetic tape 1. Alternatively, heads HA and HB may be mounted on a portion of the guide drum, which portion is adapted to be rotated so as to serve the dual purpose of guiding magnetic tape 1 therebout and rotating heads HA and HB so as to scan parallel tracks across the tape. Although not shown herein, magnetic tape 1 is adapted to be transported at the so-called normal recording/playback speed, and also at a relatively high forward or rewind speed, referred to herein as the search speed, and also at a slow forward speed.

The head assembly shown in FIG. 1 can be used either for recording video signals in parallel skewed tracks on magnetic tape 1 or, if heads HA and HB are adapted to reproduce signals, the illustrated assembly can be used for reproducing such video signals from the parallel record tracks. In one type of VTR system, a composite color video signal is recorded by separating the luminance and chrominance components from each other, by frequency-modulating the luminance component onto a higher frequency carrier and by frequency-converting the chrominance component down to a lower frequency band. Then, the frequency-modulated luminance component and the frequency-converted chrominance component are combined and recorded by heads HA and HB in alternate, parallel record tracks. In some VTR systems, adjacent record tracks, for example, the record track recorded by head HA and the next-following record track recorded by head HB, are separated from each other by a guard band. However, the use of such guard bands results in a relatively low recording density, which is inefficient. To increase the recording density, other VTR systems have been developed to record the adjacent record tracks in contiguous relation to each other. However, when such record tracks are contiguous, the scanning of one track to reproduce the video signals which had been recorded therein may be accompanied by crosstalk interference which is picked up from the adjacent track. The well-known characteristic of azimuth loss is relied upon to reduce this crosstalk interference for the higher frequency frequency-modulated luminance component.

Figure 2:
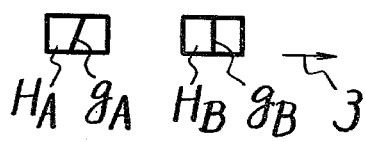
FIG. 2 is a schematic plan view of two recording heads whose recording gaps have different azimuth angles.

It is known that if a signal is recorded by a magnetic head whose gap has a different azimuth angle than that of the head which is used to reproduce that signal, then the reproduced signal will be attenuated. This attenuation, known as azimuth loss, is directly related to the signal frequency. Hence, if the frequency of the recorded signal is relatively high, its attenuation, or azimuth loss, likewise is relatively high. This characteristic is turned to account by recording one track with a magnetic head having one azimuth angle and the next adjacent track with a magnetic head having a different azimuth angle. This is schematically illustrated in FIG. 2 wherein head HA is seen to have a recording gap $g_A$ of one azimuth angle, while head HB is seen to have a recording gap $g_B$ of a different azimuth angle. In particular, the azimuth angle of gap $g_A$ is shown as being less than 90° with respect to the scanning path 3 of head HA, while gap $g_B$ of head HB is seen to have an azimuth angle of about 90° with respect to the scanning path. Thus, if signal playback heads have azimuth angles which are substantially identical to the azimuth angles of heads HA and HB, respectively, and if the playback head whose azimuth angle is equal to the azimuth angle of head HA is used to reproduce the signals which had been recorded by head HA, then those signals which had been recorded in an adjacent track by head HB will be substantially attenuated by reason of azimuth loss and, therefore, crosstalk interference attributed thereto will be significantly suppressed. Similarly, if the playback head whose azimuth angle is substantially identical to the azimuth angle of head HB is used to reproduce the signals which had been recorded by head HB, then the signals which had been recorded by head HA in adjacent tracks will be substantially attenuated during the reproducing operation because of this characteristic of azimuth loss, thereby resulting in significant suppression of crosstalk interference.

While the characteristic of azimuth loss is effective to suppress crosstalk interference due to the higher frequency frequency-modulated luminance component, it is not as effective in suppressing crosstalk interference due to the chrominance component which is recorded in an adjacent record track. This is because the frequency of the recorded chrominance component is low relative to the frequency of the recorded luminance component. Nevertheless, crosstalk interference of the chrominance component which is recorded in adjacent record tracks is suppressed by recording the chrominance component with interleaved subcarriers and by using a comb filter whose nodes are centered on the crosstalk subcarrier frequencies during a signal reproducing operation. This technique is described in greater detail in U.S. Pat. Nos. 4,007,482 and 4,007,484, and also in U.S. Pat. No. 3,918,085, all assigned to the assignee of the present invention.

Figure 3:
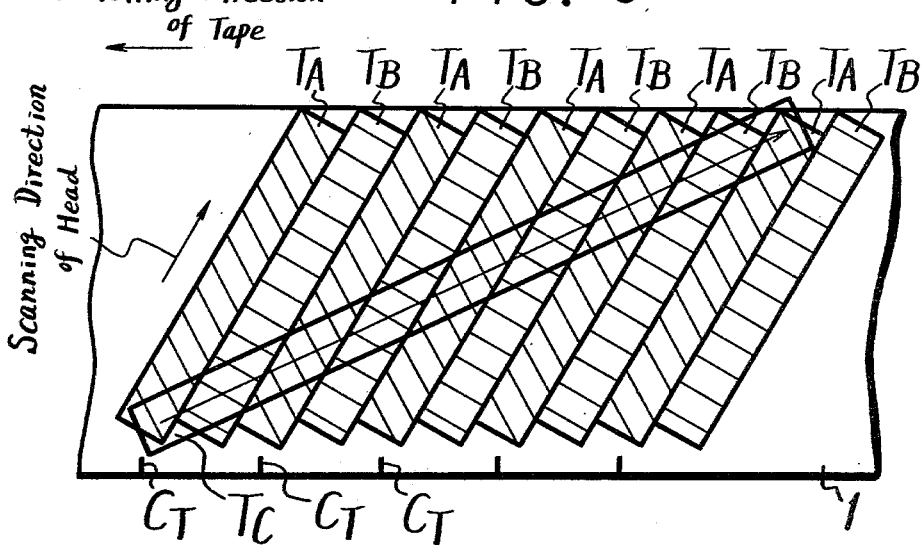
FIG. 3 is a schematic view of record tracks on a movable record medium relative to a scanning path across that record medium when the medium is moved at a relatively high speed.

When recording heads HA and HB (FIG. 2) are used in the head assembly shown in FIG. 1 to record video signals on magnetic tape 1, the resultant signals are recorded in the format shown schematically in FIG. 3. Head HA records alternate tracks $T_A$, and head HB records remaining tracks $T_B$. If magnetic tape 1 is moved from right-to-left, as viewed in FIG. 3, and the scanning paths of heads HA and HB are in the upward direction, then tracks $T_A$, which are recorded with the azimuth angle of less than 90°, are contiguous with tracks $T_B$, which are recorded with an azimuth angle equal to about 90°. The respective azimuth angles are represented by the short parallel lines which are contained within tracks $T_A$ and $T_B$, respectively. In addition to recording record tracks $T_A$ and $T_B$, as shown, control signals, or pulses $C_T$ are recorded along a longitudinal edge of magnetic tape 1 by a control head (not shown).

As is conventional in helical type VTR systems, a complete field of video signals is recorded in each track $T_A$ by head HA, and a complete field of video signals is recorded in each track $T_B$ by head HB. Thus, a frame of video signals is recorded in adjacent tracks $T_A$ and $T_B$. In accordance with the NTSC system, the signal recording rate is equal to sixty fields (thirty frames) per second, requiring a rotary speed of thirty rotations per second of heads HA and HB. Control signals $C_T$ are recorded in the vicinity of, for example, the beginnng of tracks $T_A$. Hence, these control signals are recorded in synchronism with the frame rate and, thus, at a rate of 30 Hz.

Control signals $C_T$ are used during a reproducing operation by a capstan servo circuit for controlling the rotation of the capstan which is used to transport magnetic tape 1. In addition, the control signals are used to insure that the proper playback head will scan the correct record tracks. Let it be assumed that playback heads HC and HD (not shown) have azimuth angles which are substantially identical to the azimuth angles of heads HA and HB, respectively. Playback head HC should be controlled to scan only tracks $T_A$; and playback head HD should be controlled to scan only record tracks $T_B$. This results in minimizing crosstalk interference due to the luminance component recorded in, for example, tracks $T_B$ when playback head HC scans tracks $T_A$. This also minimizes crosstalk interference due to the luminance component recorded in tracks $T_A$ when playback head HD scans tracks $T_B$. Of course, the scanning of tracks $T_B$ by head HC (and also the scanning of tracks $T_A$ by head HD) should be avoided because azimuth loss will result in a significantly attenuated reproduced video signal from which a video picture cannot be reproduced accurately. If a position pulse is generated when, for example, playback head HC rotates to a predetermined position with respect to magnetic tape 1, then this position pulse can be used in conjunction with control signal $C_T$ to synchronize the rotation of the playback heads whereby each head scans the correct track associated therewith.

During a normal reproducing operation, magnetic tape 1 is transported at a speed that is equal to the tape speed which was used in the recording operation. If the tape speed and rotary speed of the playback heads are the same during reproducing as during recording, then the playback heads will scan parallel record tracks $T_A$ and $T_B$ accurately. However, and as is appreciated, if the speed of magnetic tape 1 during a reproducing operation is much higher than the recording tape speed, the scanning path of the playback head will not coincide with any of the parallel record tracks. This high tape speed is used in a high-speed search mode wherein the magnetic tape is transported rapidly in order to bring it to a desired position so that the video signals which are recorded in particular record tracks can be reproduced. In FIG. 3, the scanning path of playback head HC, for example, during this high-speed search mode, is identified as $T_C$. If the search mode speed of magnetic tape 1 is assumed to be nine times the normal playback speed thereof, then scanning path $T_C$ will traverse portions of nine successive record tracks $T_A$, $T_B$, as shown.

Figure 4:
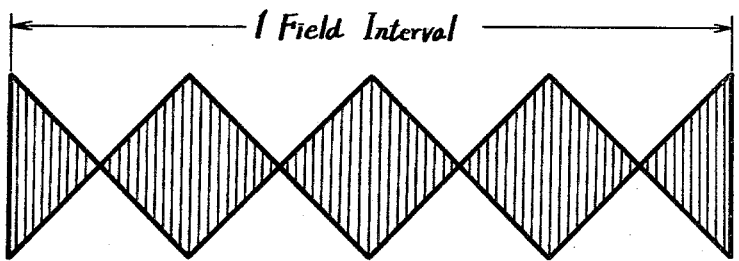
FIG. 4 is a waveform representation of the signals which are reproduced from a moving record medium by a scanning transducer when the medium is moved at a relatively high speed.

During the high speed search operation, it is preferred that the video signals which are recorded in the parallel record tracks be reproduced by the scanning playback heads so that corresponding video pictures can be displayed, thereby enabling the user to determine when that portion of tape 1 which contains the desired video signals is approached. However, if scanning path $T_C$ is traversed by, for example, head HC, then the video signals which are reproduced from each portion of each track $T_B$ are substantially attenuated because of azimuth loss. More particularly, as this playback head scans a segment of track $T_A$, the amplitude of the reproduced video signal will decrease gradually toward a minimum, or zero, level, as the head passes over a segment of track $T_B$. Then, this reproduced video signal will increase toward a maximum level as the head continues on to the next segment of adjacent track $T_A$, only to be reduced again toward its minimum level when the head reaches track $T_B$. This fluctuation in the amplitude of the reproduced video signal is repeated throughout the pass of head HC across magnetic tape 1. FIG. 4 is a waveform representation of at least the luminance component of the video signal which is reproduced by head HC as this head moves along scanning path $T_C$ during the high speed search mode. The video picture which is reproduced in response to the video signal shown in FIG. 4 contains horizontal noise bands as a result of the low level video signal which is derived from the scanning of portions of tracks $T_B$ by head HC. These noise bands interfere to a great extent with the content of the video picture, thereby making it difficult for the user to recognize the displayed video information.

A primary object of the present invention is to avoid the reproduction of such horizontal noise bands when head HC, for example, moves along scanning path $T_C$ during a high speed search mode. This object is achieved by the apparatus illustrated in FIG. 5. In this apparatus, playback heads HC and HD are rotated by a motor 14 so as to move along respective scanning paths across magnetic tape 1. Heads HC and HD are supported by adjustable head support devices 4 and 5, referred to herein as adjustable supports, which are responsive to control signals applied thereto for deflecting in a direction and by an amount determined by the polarity and magnitude of such control signals. Preferably, adjustable supports 4 and 5 are formed of a pair of leaf members, each being constructed of a piezo-electric material, and each being referred to as a bi-morph leaf assembly. A more complete description of such bi-morph assemblies, and the manner in which they support playback heads, is found in copending application Ser. No. 832,368, filed Sept. 12, 1977, now U.S. Pat. No. 4,141,047.

The illustrated apparatus also is comprised of a servo circuit formed of control head 6, wave shaper 8, frequency divider 9, phase comparator 10, position pulse generator 11 and motor 14. Control head 6 is adapted to reproduce control signals $C_T$ which are recorded along a longitudinal edge of magnetic tape 1, as discussed previously with respect to FIG. 3. Control head 6 is coupled via an amplifier 7 to wave shaper 8, the latter comprising, for example, a monostable multivibrator for generating a pulse signal of desired amplitude and duration in response to each reproduced control signal $C_T$. Frequency divider 9 is coupled to wave shaper 8 and is adapted to divide the frequency of the pulse signals generated by the wave shaper by a factor which is determined by the search mode speed of the magnetic tape. For example, and as has been assumed herein, if the search mode speed of the magnetic tape is nine times as great as the normal playback speed, then frequency divider 9 divides the frequency of the pulses produced by wave shaper 8 by a factor of nine. These frequency-divided pulses, which may be thought of as track indicating pulses $P_C$, are supplied to phase comparator 10.

Position pulse generator 11 comprises, for example, a magnetic sensing element, such as a reed switch, which is adapted to generate a position pulse $P_G$ when a magnetic element which is secured to the drive shaft extending between motor 14 and the rotary head assembly rotates therepast. This magnetic element is so positioned that a position pulse $P_G$ is generated by position pulse generator 11 when, for example, playback head HC rotates into a predetermined position with respect to magnetic tape 1. This predetermined position may be the initial magnetic contact of the head to the tape. Wave shaper 12, which may comprise a monostable multivibrator similar to wave shaper 8, is connected to receive position pulses $P_G$ and to supply shaped position pulses to another input of phase comparator 10. The phase comparator, which may be of conventional construction, is adapted to generate an adjustment signal depending upon the phase differential between the track indicating pulses $P_C$ and the position pulses $P_G$ which are supplied thereto. This control signal is supplied through an amplifier 13 to motor 14 (or to a motor control circuit) for controlling the rotation of the motor. Hence, the illustrated servo circuit is seen to synchronize the rotation of playback heads HC and HD with the search mode speed of magnetic tape 1.

Figure 5:
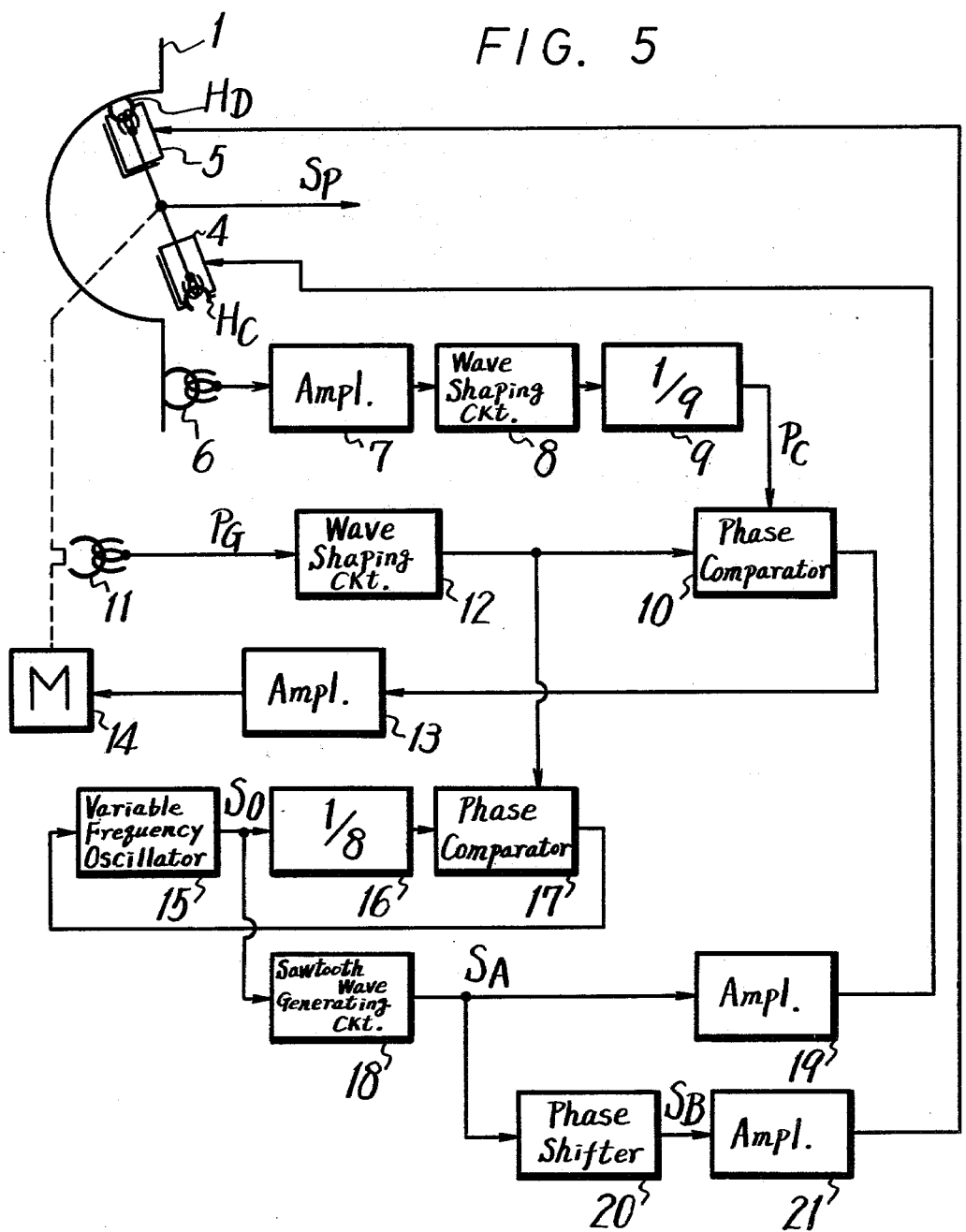
FIG. 5 is a block diagram of one embodiment of the present invention.

The apparatus illustrated in FIG. 5 also includes a phase-locked loop comprised of a variable frequency oscillator 15, such as a voltage-controlled oscillator (VCO), a frequency divider 16 and a phase comparator 17. Variable frequency oscillator 15 is adapted to generate an oscillating signal $S_O$, such as a pulse train, having a frequency determined by a control voltage supplied to the oscillator. Frequency divider 16 is coupled to the output of variable frequency oscillator 15 and exhibits a dividing ratio sufficient to divide the frequency of the oscillating signal $S_O$ down to a frequency which is equal to the frequency of the position pulses $P_G$. In the illustrated embodient, wherein the search mode speed of magnetic tape 1 has been assumed to be equal to nine times the normal playback speed thereof, it also is assumed that the frequency of the oscillating signal $S_O$ is eight times the frequency of the position pulses $P_G$. Hence, frequency divider 16 divides the frequency of the oscillating signal $S_O$ by a factor of eight. The frequency-divided oscillating signal is supplied to one input of phase comparator 17, and the position pulses $P_G$ are supplied to another input of the phase comparator. Phase comparator 17 is similar to phase comparator 10 and produces a control voltage in accordance with any phase differential between the oscillating signal $S_O$ and the position pulses $P_G$. This control voltage is applied to variable frequency oscillator 15 to control the oscillating frequency thereof. Hence, the illustrated phase-locked loop synchronizes the phase of the oscillating signal $S_O$ to the phase of the position pulses $P_G$. Accordingly, the phase of oscillating signal $S_O$ is synchronized with the search mode speed of magnetic tape 1.

Bi-morph leaf assemblies 4 and 5 are controlled by a control signal having a sawtooth waveform generated by sawtooth waveform generator 18 and supplied to bi-morph leaf assembly 4 by an amplifier 19, and to bi-morph leaf assembly 5 by a phase shifter 20 through an amplifier 21. Sawtooth waveform generator 18 may be of conventional construction, such as a capacitor which is charged through a predetermined resistance, the capacitor being discharged in response to each pulse generated by variable frequency oscillator 15. Thus, the sawtooth waveform $S_A$ generated by sawtooth waveform generator 18 is synchronized with the oscillating signal $S_O$ which, in turn, is synchronzed with the position pulses $P_G$, these pulses being, in turn, synchronized with the search mode speed of magnetic tape 1.

Each of bi-morph leaf assemblies 4 and 5 is constructed of piezo-electric material, as aforesaid. Typical examples of this piezo-electric material are barium titanium oxide ($BaTiO_3$), lead titanium oxide ($PbTiO_3$) and lead niobium oxide ($PbNb_2O_6$). Other piezo-electric materials can be used, if desired. Depending upon the polarity and magnitude of the control signal supplied thereto, the bi-morph assembly deflects, or flexes, in a direction transversely of the scanning path across which the playback head is moved. Hence, in response to a control voltage of sawtooth waveform, the bi-morph leaf assembly in gradually deflected in a direction depending upon the slope of the sawtooth waveform, to be returned to an initial, or starting position at the beginning of each sawtooth waveform period.

The manner in which the apparatus illustrated in FIG. 5 operates now will be described with reference to the waveforms shown in FIGS. 6A–6E, and with additional reference to FIG. 7. Motor 14 drives the rotary head assembly such that each of playback heads HC and HD passes over magnetic tape 1 at a rate of thirty rotations per second. Thus, these heads reproduce the video signals from the magnetic tape at a rate of thirty frames (or sixty fields) per second. It is recalled that control signal $C_T$ had been recorded along the longitudinal edge of magnetic tape 1 at the repetition rate of thirty pulses per second. Therefore, when the magnetic tape is transported at its search mode speed (e.g. nine times as great as its normal playback speed), control head 6 reproduces the control signals $C_T$ at the rate of 270 ($9 \times 30$) pulses per second. These pulses, after being suitably shaped by wave shaper 8, are divided in frequency divider 9 by a factor of nine, resulting in track indicating pulses $P_C$ having the frequency of thirty pulses per second. These track indicating pulses $P_C$ are phase-compared to the position pulses $P_G$, the latter pulses also having the repetition rate of thirty pulses per second, as determined by the rotary speed of the rotary head assembly. Motor 14 is controlled by the illustrated servo circuit such that the phase of the position pulses $P_G$ is sychronized with the phase of the track indicating pulses $P_C$. These phase-synchronized position pulses $P_G$ are produced at the frame repetition rate, and are illustrated in FIG. 6A.

As shown in FIG. 3, and also in FIG. 7, when magnetic tape 1 is transported at the search mode speed, the scanning path $T_C$ traversed by, for example, playback head HC passes over four segments of tracks $T_A$. As shown more clearly in FIG. 7, scanning path $T_C$ passes over a portion of a segment of track $T_{A1}$, a full segment of track $T_{A2}$, a full segment of track $T_{A3}$, a full segment of track $T_{A4}$ and a portion of a segment of track $T_{A5}$. As will become apparent, since four full segments of these tracks are scanned by head HC in the high speed search mode, the sawtooth waveform control signal which is supplied to bi-morph leaf assembly 4 should have four full periods during field interval $F_A$, that is, the interval during which head HC traverses scanning path $T_C$. This means that the sawtooth waveform generated by sawtooth wave form generator 18 should have eight full periods during each frame interval. To achieve this, the oscillating frequency of oscillating signal $S_O$ produced by variable frequency oscillator 15 is equal to 240 Hz ($8 \times 30$). The frequency of oscillating signal $S_O$ is divided by a factor of eight in frequency divider 16, resulting in a pulse frequency of 30 Hz. This frequency-divided oscillating signal is compared in phase comparator 17 to the phase of position pulses $P_G$. This phase comparison is used to synchronize the phase of the oscillating signal $S_O$ to the phase of the position pulses, and thus to the speed of magnetic tape 1. THe phase-synchronized oscillating signal $S_O$ is illustrated in FIG. 6B; and the sawtooth waveform control signal $S_A$ is illustrated in FIG. 6C.

Sawtooth waveform control signal $S_A$ is supplied to bi-morph leaf assembly 4; and a phase-shifted version of this sawtooth waveform control signal is supplied to bi-morph leaf assembly 5. Phase shifter 20 imparts a phase-shift of 180° to sawtooth waveform control signal $S_A$ to produce the phase-shifted version thereof $S_B$, shown in FIG. 6D.

At the beginning of field interval $F_A$, playback head HC is positioned at the beginning of track $T_{A1}$ shown in FIG. 7. It is recognized that as tape 1 moves in the indicated direction while playback head HC moves along scanning path $T_C$, the playback head diverges from track $T_{A1}$. However, at the same time, the sawtooth waveform control voltage $S_A$ which is supplied to bi-morph leaf assembly 4 effects a positive displacement, or deflection, of this bi-morph leaf assembly. This displaces playback head HC in the direction indicated by arrow 30 such that even though the rotary head assembly tends to drive this head along scanning path $T_C$, the displacement thereof due to the deflection of bi-morph leaf assembly 4 maintains this head in alignment with track $T_{A1}$.

When the sawtooth waveform control voltage $S_A$ returns to its initial, negative level at the beginning of the next sawtooth waveform period, playback head HC would be positioned over track $T_B$ adjacent track $T_{A1}$. However, this negative level of the sawtooth waveform control voltage deflects bi-morph leaf assembly 4 in the direction indicated by arrow 31 so as to position playback head HC over track $T_{A2}$. Then, as the rotary head assembly continues to rotate, the gradually increasing sawtooth waveform control voltage effects a gradual deflection in bi-morph assembly 4 in the direction indicated by arrow 30. This means that playback head HC is maintained in alignment with track $T_{A2}$. At the end of this sawtooth waveform period, the sawtooth waveform control voltage $S_A$ (FIG. 6C) again returns to its initial, negative level, whereby bi-morph leaf assembly 4 is deflected in the direction indicated by arrow 31 so as to position playback head HC over track $T_{A3}$. As playback head HC is further rotated by the rotary head assembly, the foregoing periodic sawtooth deflection of bi-morph leaf assembly 4 is repeated.

Therefore, it is seen that, during field interval $F_A$ while playback head HC is driven along scanning path $T_C$, the sawtooth waveform control voltage $S_A$ which is applied to bi-morph assembly 4 deflects this bi-morph leaf assembly so as to displace playback head HC, whereby this playback head scans a portion of a segment of the track $T_{A1}$, then rapidly skips over adjacent track $T_B$ to scan the next successive segment on track $T_{A2}$, then rapidly skips over adjacent track $T_B$ to scan the next successive segment on track $T_{A3}$, then rapidly skips over adjacent track $T_B$ to scan the next successive segment on track $T_{A4}$, then rapidly skips over adjacent track $T_B$ to scan a portion of the next successive segment on track $T_{A5}$. At the end of field interval $F_A$, playback head HC reaches the end of scanning path $T_C$, and playback head HD now arrives at the beginning of its scanning path T. Thus, during the next successive field interval $F_B$, the foregoing operation is repeated with respect to playback head HD, whereby this playback head scans a portion of a segment on track $T_{B1}$, then rapidly skips over adjacent track $T_A$ to scan the next successive segment on track $T_{B2}$, and so on. It is appreciated that the purpose of phase shifter 20 is to deflect bi-morph leaf assembly 5 so as to position playback head HD at the beginning of the first track $T_{B1}$ in field interval $F_B$.

Sawtooth waveform control voltage $S_A$ is illustrated by a solid line during field interval $F_A$ to indicate that this sawtooth waveform control voltage is effective during this field interval so as to align playback head HC with segments of the record tracks which had been recorded with the same azimuth angle as this playback head. Bi-morph leaf assembly 4 may be subjected to a sawtooth-like deflection during field interval $F_B$, as indicated by the broken lines of sawtooth waveform $S_A$; or, alternatively, a switch (not shown) may be opened during field interval $F_B$ to interrupt the supply of the sawtooth waveform control voltage to bi-morph leaf assembly 4 during those field intervals that playback head HC does not scan across magnetic tape 1. Similarly, the phase-shifted version $F_B$ of the sawtooth waveform control voltage may be applied to bi-morph leaf assembly 5 during field interval $F_A$ or, alternatively, a switch (not shown) may be opened to interrupt such sawtooth-like deflections of this bi-morph leaf assembly during those field intervals that playback head HD does not pass over the magnetic tape.

The video signal $S_p$ produced by playback heads HC and HD during field intervals $F_A$ and $F_B$, respectively, is shown in FIG. 6E. With respect to playback head HC, since this head is maintained in substantial alignment with segments of tracks $T_{A1}$, $T_{A2}$, . . . which has been recorded with the same azimuth angle as that of playback head HC, a recognizable video picture is produced from these scanned segments. Moreover, because playback head HC rapidly skips over those tracks which had been recorded with a different azimuth angle, only brief horizontal noise bands, corresponding to the zero video signal levels shown in FIG. 6E, will be present in the video picture. Similarly, during field interval $F_B$, playback head HD scans segments of those tracks which had been recorded with the same azimuth angle as that of this playback head, resulting in a reproduced video signal from which the video picture is easily recognized. Because playback head HD rapidly skips over those tracks which had been recorded with a different azimuth angle, the horizontal noise bands which appear during field interval $F_B$ are relatively narrow, corresponding to the zero video signal levels shown in FIG. 6E. As a consequence of the apparatus illustrated in FIG. 5, the video picture which is produced during the high speed search mode can be recognized clearly by the user, who thus can determine when the desired location of magnetic tape 1 is approached. As may be appreciated, the width of these horizontal noise bands is determined by the delay for the sawtooth waveforms $S_A$ and $S_B$ to change over their maximum positive levels to their maxium negative levels.

Although the foregoing has described the operation of the apparatus illustrated in FIG. 5 when magnetic tape 1 is transported at its high speed search mode, it should be recognized that this invention can be used to produce an accurate video picture when the magnetic tape is transported at a slower-than-normal speed. At such a slow speed, the scanning path $T_C$ traversed by playback heads HC and HD crosses a plurality of adjacent tracks $T_A$ and $T_B$ at an angle that is more oblique to the direction at which tape 1 is moved than at the aforedescribed search mode speed. Nevertheless, bi-morph leaf assemblies 4 and 5 can be deflected in the manner similar to that discussed above, whereby each head scans a segment of only those tracks which had been recorded with the same azimuth angle as that of the playback head, while rapidly skipping over those tracks which has been recorded with a different azimuth angle.

While the present invention has been described with respect to a preferred embodiment thereof, it should be readily apparent to those of ordinary skill in the art that various changes and modifications in form and details can be made without departing from the spirit and scope of this invention. For example, the reproducing system in which the apparatus illustrated in FIG. 5 is used need not be limited solely to the two-head helical scan VTR. It is contemplated that this invention also can be used in a VTR having more than two heads, such as in a quadraplex system. Also, the record tracks $T_A$ and $T_B$ which are recorded on the magnetic tape can be separated by guard bands; and, if crosstalk interference is not a problem with such guard bands, all of the tracks can be recorded (and thus reproduced) with the same azimuth angle. In that event, bi-morph leaf assemblies 4 and 5 are controlled such that each playback head scans a segment of a record track while rapidly skipping over a guard band. Still further, the present invention can be employed in a VTR having only a single recording or reproducing head, such as the omega-type VTR. Also, and as mentioned above, the reproducing system with which this invention is used need not be limited solely to a system having magnetic tape as the record medium. Magnetic sheets, magnetic discs and other recording media can be used with this invention.

Therefore, it is intended that the appended claims be interpreted as including the foregoing as well as other such changes and modifications.

What is claimed is:

1. In a signal reproducing system of the type having at least one rotary transducer which rotates along a scannning path across a movable record medium to reproduce, during each pass of said transducer across said record medium, signals which are recorded in parallel record tracks on said medium, apparatus for controlling the scanning path of said transducer when said record medium is moved at a speed different from the recording speed thereof and wherein said transducer scans plural record tracks during each pass thereof across said record medium when said record medium is moved at said different speed, said apparatus comprising:
    control signal generating means for producing a periodic tracking control signal synchronized with the speed at which said record medium is moved, said periodic control signal having a plurality of periods during each pass of said transducer;
    adjustable support means for said transducer, said adjustable support means being responsive to said tracking control signal to displace said transducer transversely of said scanning path thereof; and
    means for applying said tracking control signal to said adjustable support means, such that said transducer scans successive segments of predetermined record tracks during a pass thereof across said record medium.

2. The apparatus of claim 1 wherein said adjustable support means is formed of piezo-electric material.

3. The apparatus of claim 2 wherein said piezo-electric material comprises a bi-morph leaf assembly to displace said transducer in a direction depending upon the polarity of said tracking control signal.

4. The apparatus of claim 1, 2 or 3 wherein said control signal generating means comprises sawtooth waveform generating means for generating a periodic sawtooth waveform control signal having a plurality of periods during each pass of said transducer.

5. The apparatus of claim 4 wherein said control signal generating means further comprises position detecting means for detecting when said rotary transducer rotates to a predeterimined position on said record medium and for generating position pulses representative thereof; variable frequency oscillating means for generating an oscillating signal of controllable frequency; phase-locked loop means for synchronizing the phase of said variable frequency oscillating means to the phase of said position pulses; and means for supplying said oscillating signal to said sawtooth waveform generating means such that said periodic sawtooth waveform control signal is synchronized with said oscillating signal.

6. The apparatus of claim 5 wherein said control signal generating means further comprises track detecting means for detecting the presence of said parallel record tracks as said record medium is moved and for generating track indicating pulses representative thereof; and servo control means responsive to said track indicating pulses for synchronizing the rotation of said transducer with the movement of said record medium.

7. The apparatus of claim 4 wherein said record medium is a magnetic medium, adjacent record tracks are recorded by magnetic recording heads having different azimuth angles, and said signal reproducing apparatus has two rotary transducers disposed 180° apart of different azimuth angles, each of said transducers being supported on a respective adjustable support means and each being rotated along respective, alternate scanning paths across said record medium, such that one of said transducers scans successive segments of alternate record tracks which were recorded by the magnetic head having one azimuth angle, and the other of said transducers scans successive segments of alternate record tracks which were recorded by the magnetic head having the different azimuth angle.

8. The apparatus of claim 7 wherein said means for applying said periodic sawtooth waveform control signal to said adjustable support means includes phase shift means for shifting the phase of said sawtooth waveform control signal supplied to one of said adjustable support means by 180° relative to the phase of said sawtooth waveform control signal supplied to the other of said adjustable support means.

9. The apparatus of claim 8 wherein the number of periods of said sawtooth waveform control signal during each pass of a respective transducer is equal to the number of record tracks having segments scanned by said respective transducer during said pass.

10. The apparatus of claim 9 wherein each sawtooth waveform of said control signal causes a respective adjustable support means to deflect in a first direction prior to the start of the scanning of a segment by the transducer supported thereby and then to deflect in the opposite direction by a progressively increasing amount during said scanning of said segment.

* * * * *

UNITED STATES PATENT AND TRADEMARK OFFICE
CERTIFICATE OF CORRECTION

PATENT NO. : 4,189,758
DATED : February 19, 1980
INVENTOR(S) : MINORU MORIO et al.

It is certified that error appears in the above—identified patent and that said Letters Patent are hereby corrected as shown below:

On the cover page insert:

--[73] Assignee: Sony Corporation, Tokyo, Japan--

Signed and Sealed this

Twenty-eighth Day of October 1980

[SEAL]

Attest:

SIDNEY A. DIAMOND

Attesting Officer *Commissioner of Patents and Trademarks*